US012558636B2

(12) United States Patent
Thompson et al.

(10) Patent No.: US 12,558,636 B2
(45) Date of Patent: Feb. 24, 2026

(54) GAS SUPPLY SYSTEM WITH WATER REMOVAL

(71) Applicant: Oxus America, Inc., Auburn Hills, MI (US)

(72) Inventors: Loren M. Thompson, Lapeer, MI (US); Andrew Voto, Waterford, MI (US)

(73) Assignee: Oxus America, Inc., Auburn Hills, MI (US)

( * ) Notice: Subject to any disclaimer, the term of this patent is extended or adjusted under 35 U.S.C. 154(b) by 299 days.

(21) Appl. No.: 18/367,509

(22) Filed: Sep. 13, 2023

(65) Prior Publication Data

US 2024/0115970 A1 Apr. 11, 2024

Related U.S. Application Data

(60) Provisional application No. 63/413,733, filed on Oct. 6, 2022.

(51) Int. Cl.
| | |
|---|---|
| *B01D 1/20* | (2006.01) |
| *B01D 5/00* | (2006.01) |
| *B01D 53/04* | (2006.01) |
| *B01D 53/047* | (2006.01) |
| *B01D 53/26* | (2006.01) |

(52) U.S. Cl.
CPC ........... *B01D 5/009* (2013.01); *B01D 5/0039* (2013.01); *B01D 53/0438* (2013.01); *B01D 53/0446* (2013.01); *B01D 53/047* (2013.01); *B01D 53/0476* (2013.01); *B01D 53/265* (2013.01); *B01D 2256/12* (2013.01); *B01D 2257/80* (2013.01)

(58) Field of Classification Search
CPC . B01D 1/14; B01D 1/16; B01D 5/009; B01D 5/0039; B01D 53/0438; B01D 53/04; B01D 53/047; B01D 53/0476; B01D 53/0446; B01D 53/265; B01D 2256/12; B01D 2257/80
USPC .................. 96/108, 121; 128/204.18, 205.12
See application file for complete search history.

(56) References Cited

U.S. PATENT DOCUMENTS

| | | | | |
|---|---|---|---|---|
| 4,342,573 | A * | 8/1982 | McCombs | .............. F04B 49/02 55/494 |
| 7,780,768 | B2 | 8/2010 | Taylor et al. | |
| 8,616,207 | B2 | 12/2013 | Wilkinson | |
| 2003/0037679 | A1 * | 2/2003 | Kitchener | ........... F04C 29/0092 96/270 |
| 2009/0205493 | A1 | 8/2009 | Thompson et al. | |

(Continued)

FOREIGN PATENT DOCUMENTS

| | | |
|---|---|---|
| CN | 105157125 A | 12/2015 |
| KR | 20040009599 A | 1/2004 |
| WO | 2017106640 A1 | 6/2017 |

OTHER PUBLICATIONS

European Search Report for EP Patent Application No. 23200676.7 dated Apr. 15, 2024, 13 pages.

(Continued)

*Primary Examiner* — Frank M Lawrence, Jr.
(74) *Attorney, Agent, or Firm* — Young Basile Hanlon & MacFarlane, P.C.

(57) ABSTRACT

A gas supply system utilizes waste heat from a compressor to promote evaporation of liquid waste water that is generated as condensate by the compressor.

20 Claims, 5 Drawing Sheets

(56)                 References Cited

U.S. PATENT DOCUMENTS

| | | |
|---|---|---|
| 2009/0211448 A1 | 8/2009 | Mcclain |
| 2016/0245555 A1* | 8/2016 | Tanaka ................. B65D 81/266 |
| 2024/0178415 A1* | 5/2024 | Katz .................... B01D 53/265 |
| 2025/0163903 A1* | 5/2025 | Qualkenbush .......... F04B 39/06 |

OTHER PUBLICATIONS

Guanwei Jia et al: "The experimental analysis of the water spray cooling compressed air", Mechanics & Industry, vol. 18, No. 2, Jan. 1, 2017 (Jan. 1, 2017), p. 211, XP093127302, GB ISSN: 2257-7777, DOI: 10.1051/meca/2016068.

Jeng et al: "An investigation into a piezoelectrically actuated nebulizer with micro-EDM-made micronozzle array", Experimental Thermal and Fluid Science, Elsevier, Amsterdam, NL, vol. 31, No. 8, Jul. 21, 2007 (Jul. 21, 2007), pp. 1147-1156, XP022162791, ISSN: 0894-1777, DOI: 10.1016/J.EXPTHERMFLUSCI.2006.12. 001.

Yang J.C. et al: "A simple piezoelectric droplet generator", Experiments in Fluids, vol. 23, No. 5, Nov. 19, 1997 (Nov. 19, 1997), pp. 445-447, XP093127998, DE ISSN: 0723-4864, DOI: 10.1007/ s003480050134 Retrieved from the Internet: URL:https://link. springer.com/content/pdf/10.1007/s003480050134.pdf>.

Lopez-Herrera et al.: "An experimental study of the electrospraying of water in air at atmospheric pressure", Journal of the American Society for Mass Spectrometry, Elsevier Science Inc, US, vol. 15, No. 2, Feb. 1, 2004 (Feb. 1, 2004), pp. 253-259, XP005102388, ISSN: 1044-0305, DOI: 10.1016/J.JASMS.2003.10.018.

Yu Qihui et al: "Water spray heat transfer gas compression for compressed air energy system", Renewable Energy, Pergamon Press, Oxford, GB, vol. 179, Jul. 28, 2021 (Jul. 28, 2021), pp. 1106-1121, XP086793882, ISSN: 0960-1481, DOI: 10.1016/J. RENENE.2021.07.128 [retrieved on Jul. 28, 2021].

Asadi Dereshgi Hamid et al: "Piezoelectric micropumps: state of the art review", Microsystem Technologies, Berlin, De, vol. 27, No. 12, Jan. 13, 2021 (Jan. 13, 2021), pp. 4127-4155, XP037618059, ISSN: 0946-7076, DOI: 10.1007/S00542-020-05190-0 [retrieved on Jan. 13, 2021].

Li Chenxi et al: "How volatile components catalyze vapor nucleation", Science Advances, vol. 7 , No. 3, Jan. 15, 2021 (Jan. 15, 2021), XP093128283, US ISSN: 2375-2548, DOI: 10.1126/sciadv. abd9954.

* cited by examiner

GAS SUPPLY SYSTEM WITH WATER REMOVAL

CROSS-REFERENCE TO RELATED APPLICATION(S)

This application claims the benefit of U.S. Provisional Application No. 63/413,733, filed on Oct. 6, 2022, the contents of which are hereby incorporated in their entirety herein for all purposes.

TECHNICAL FIELD

The present disclosure relates generally to gas supply systems.

BACKGROUND

Gas supply systems may include an air compressor to supply pressurized air. The pressurized air may be used as a product gas, or may be used for another purpose, such as oxygen concentration. When air is compressed, the ability of the air to hold water vapor decreases, and part of the water vapor in the air may condense into liquid water (which may be referred to herein as condensate). Because of this, systems that include an air compressor may have a mechanism by which liquid water is collected and removed from the system.

SUMMARY

One aspect of the disclosure is a gas supply system. The gas supply system includes a housing that defines a cooling duct. The gas supply system also includes a compressor that is located in the housing, is configured to compress air, generates liquid waste water as a byproduct, and generates waste heat during operation of the compressor. The gas supply system also includes a water removal device that aerosolizes the liquid waste water to generate aerosolized waste water and exposes the aerosolized waste water to the waste heat from the compressor in the cooling duct to promote evaporation of the aerosolized waste water using the waste heat from the compressor.

In some implementations of the gas supply system, the water removal device includes a piezo actuator that is configured to aerosolize the liquid waste water. In some implementations of the gas supply system, the piezo actuator is configured to convert electrical energy into a mechanical displacement according to the piezoelectric effect.

In some implementations of the gas supply system, the water removal device includes a perforated plate that is exposed to the liquid waste water and vibrated by the piezo actuator to aerosolize the liquid waste water. In some implementations of the gas supply system, the perforated plate includes holes that each have a diameter of between 4 $\mu$m and 10 $\mu$m. In some implementations of the gas supply system, vibration of the perforated plate by the piezo actuator creates droplets of the liquid waste water, the droplets having a droplet size between 4 $\mu$m and 10 $\mu$m.

In some implementations of the gas supply system, the water removal device includes a driver circuit that is configured to generate a high-frequency signal and to supply the high-frequency signal to the piezo actuator. In some implementations of the gas supply system, the water removal device includes a water absorbing pad that is located adjacent to the perforated plate to supply the liquid waste water to the perforated plate.

In some implementations of the gas supply system, the water removal device includes a device housing that defines a reservoir, and the water absorbing pad is located in the reservoir. In some implementations of the gas supply system, the device housing defines a port, and the liquid waste water is introduced into the reservoir of the device housing through the port. In some implementations of the gas supply system, the water removal device includes a seal, wherein the seal is annular, having an outer periphery engaged with the device housing and having an inner periphery engaged with at least one of the piezo actuator or the perforated plate to further define the reservoir.

In some implementations of the gas supply system, the gas supply system includes a fan that circulates a stream of air through the cooling duct so that the stream of air absorbs at least some of the waste heat from the compressor. In some implementations of the gas supply system, the cooling duct has an inlet that receives the stream of air from an ambient environment and an outlet that exhausts the stream of air to the ambient environment.

In some implementations of the gas supply system, the gas supply system includes adsorbent media beds that receive compressed air from the compressor and are controlled according to at least one of a pressure swing adsorption cycle or a vacuum pressure swing adsorption cycle to generate an oxygen enriched gas.

Another aspect of the disclosure is a gas supply system that includes a housing that defines a cooling duct, the cooling duct including a first portion and a second portion that are both adjacent to a housing wall, wherein an opening is formed in the housing wall. A compressor is located in the housing, is configured to compress air, generates liquid waste water as a byproduct, and generates waste heat during operation of the compressor. The gas supply system includes a water removal device that is located in the opening of the housing wall so that the water removal device blocks the opening. The water removal device includes an evaporation pad that is exposed to the first portion of the cooling duct and the second portion of the cooling duct. The liquid waste water is supplied to the evaporation pad to expose the liquid waste water to a stream of air in the cooling duct to promote evaporation of the liquid waste water using the waste heat from the compressor.

In some implementations, a first side of the evaporation pad faces the first portion of the cooling duct, and second side of the evaporation pad faces the second portion of the cooling duct. The water removal device may define a channel that extends around the evaporation pad and is configured to carry the liquid waste water in order to distribute the liquid waste water to the evaporation pad.

The gas supply system may include a fan that circulates the stream of air through the cooling duct so that the stream of air absorbs at least some of the waste heat from the compressor. The cooling duct may have an inlet that receives the stream of air from an ambient environment and an outlet that exhausts the stream of air to the ambient environment. The gas supply system may also include adsorbent media beds that receive compressed air from the compressor and are controlled according to at least one of a pressure swing adsorption cycle or a vacuum pressure swing adsorption cycle to generate an oxygen enriched gas.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The disclosure herein relates to a gas supply system that includes a water removal device. The gas supply systems disclosed herein include an air compressor, and are configured to supply one or more of compressed air or oxygen enriched gas as a product gas. The disclosure herein will be made with reference to an oxygen concentrator as an example of a gas supply system, but it should be understood that the water removal devices described herein can be applied to gas supply systems of other types.

The water removal devices disclosed herein may eliminate the need for manual disposal of waste water by promoting evaporation of the waste water. In some implementations, the waste water is supplied to a piezo atomizer that aerosolizes the waste water. The aerosolized waste water may be exposed to a stream of air that is heated by waste heat from the air compressor of the gas supply system. In some implementations, the waste water is supplied to an evaporation pad that is exposed to a stream of air that is heated by waste heat from the air compressor of the gas supply system.

Figure 1:
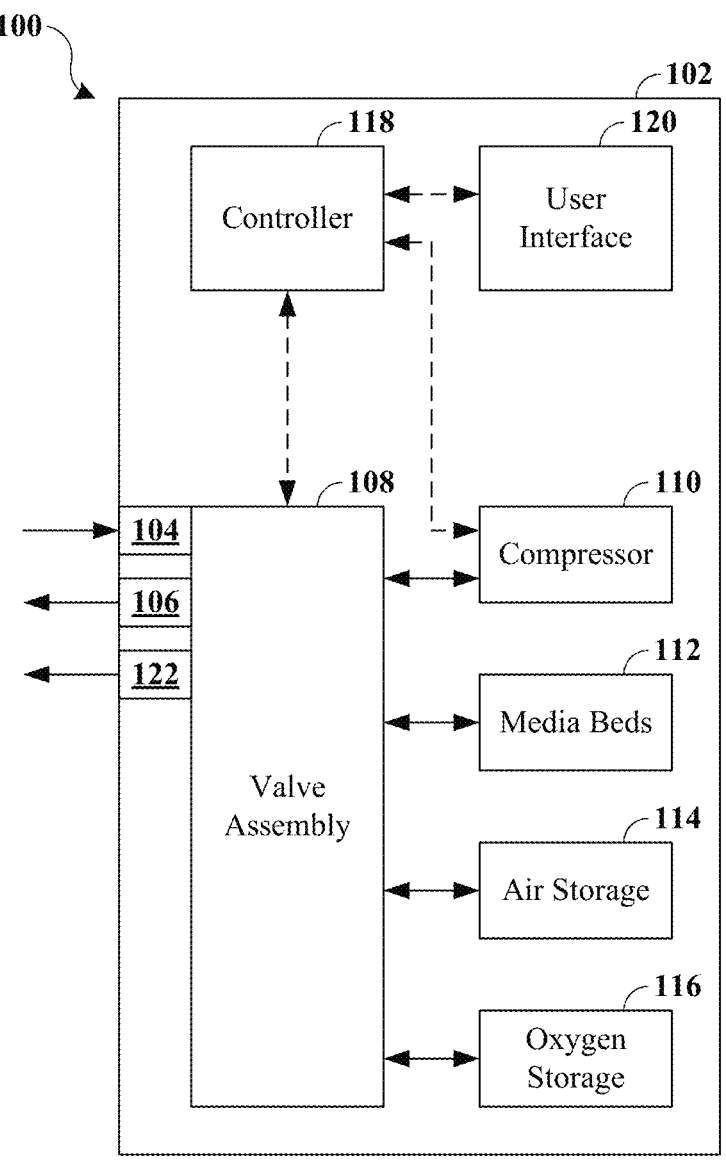
FIG. 1 is a block diagram showing an oxygen concentrator system according to an example.

FIG. 1 is a block diagram of an oxygen concentrator 100, which is an example of a gas supply system that is configured to supply a product gas. The product gas may be compressed air, oxygen enriched gas, or a mixture thereof. The oxygen concentrator 100 may be a portable system that can be carried by a user, or may be a non-portable system.

The oxygen concentrator 100 may be an oxygen concentration device of any kind, such as one that operates on a pressure swing adsorption (PSA) cycle or a vacuum pressure swing adsorption (VPSA) cycle. The oxygen concentrator 100 is operable to receive air as an input gas and separate the air into constituent components to generate a product gas and an output. As an example, the oxygen concentrator 100 may be configured to generate an oxygen enriched gas as the product gas, the oxygen enriched gas comprising at least 50% oxygen. As an example, the oxygen concentrator 100 may be configured to generate substantially pure oxygen as the product gas, the substantially pure oxygen comprising 82-96% oxygen.

The oxygen concentrator 100 may include a housing 102, an inlet port 104, an outlet port 106, a compressor 110, a valve assembly 108, media beds 112, a compressed air storage tank 114, and a product gas storage tank 116. Operation of the oxygen concentrator 100 may be regulated by a controller 118 and through a user interface 120.

Additional components may be included in the oxygen concentrator 100, including conventional components as are known in the art.

The housing 102 is configured to support, contain, and/or enclose various components of the oxygen concentrator 100. As an example, the compressor 110, the valve assembly 108, media beds 112, the compressed air storage tank 114, and the product gas storage tank 116 may be located in the housing 102. The housing 102 may be a generally rigid structure, for example, formed from plastic or another suitable material, and may be a multi-part structure. At the exterior of the housing 102, the inlet port 104 and the outlet port 106 are accessible.

The inlet port 104 (e.g., an ambient air inlet port) and the outlet port 106 (e.g., a product gas outlet port) may both be connected to the valve assembly 108 or otherwise connected to components of the oxygen concentrator 100. The inlet port 104 is exposed to ambient air from the environment around the oxygen concentrator 100, and is configured to supply the ambient air to the oxygen concentrator 100 at the ambient temperature and pressure of the environment. The outlet port 106 is configured to deliver the product gas for use in an intended application, such as by supplying the product gas to a cannula for administration to a person or storing the product gas in an external storage tank.

The valve assembly 108 includes multiple controllable valves that are configured to regulate the flow of air and product gas between components of the oxygen concentrator 100. As an example, the valve assembly 108 may include solenoid valves that are controllable by the controller 118 (e.g., by supply of electrical signals to the solenoid valves). Other types of valves may be used. The valve assembly 108 may be pneumatically connected to the inlet port 104, the outlet port 106, the compressor 110, the media beds 112, the compressed air storage tank 114, and the product gas storage tank 116. The valve assembly 108 may also include one or more valves that are configured to control a flow of liquid waste water, such as condensate produced by the compressor 110.

The compressor 110 is located in the housing 102, is configured to compress air, generates liquid waste water as a byproduct of compressing air, and generates waste heat during operation. The compressor 110 may be an air compressor configured to receive air from the inlet port 104 and increase the pressure of the air for use in oxygen concentration or for delivery as all or part of the product gas. The compressor 110 may be of any suitable type, such as a reciprocating compressor, a wobble compressor, a vane compressor, or a screw compressor. The compressor 110 may be configured to deliver the compressed air, as examples, to the outlet port 106, the media beds 112, and/or the compressed air storage tank 114. The compressed air may be delivered through the valve assembly 108 to control the destination of the compressed air under direction from the controller 118.

The media beds 112 include an adsorbent material that is contained within a pressurizable vessel. The media beds 112 may be referred to as sieve modules or sieve beds. The adsorbent material of the media beds 112 is used to separate oxygen from other components of ambient air, such as nitrogen, through pressurization of the adsorbent material according to the PSA cycle or the VPSA cycle. As an example, the adsorbent material may be a zeolite material. Thus, the oxygen concentrator 100 may include adsorbent media beds, such as the media beds 112, that receive compressed air from the compressor 110 and are controlled according to at least one of the PSA cycle or the VPSA cycle to generate the product gas, such as oxygen enriched gas. In a typical implementation, two of the media beds 112 are included and are controlled separately so that one of the media beds 112 is always available to supply oxygen. For example, a first one of the media beds 112 may be supplying oxygen while a second one of the media beds is in the nitrogen purge phase of its cycle.

To produce the product gas (e.g., oxygen enriched gas) using the media beds 112, air from the inlet port 104 is supplied to the compressor 110 by operation of the valve assembly 108. The pressurized air is then supplied from the compressor 110 or from the compressed air storage tank 114 to the media beds 112 at a pressure that is higher than ambient pressure. The air is subsequently released from the media beds 112 as the product gas. In particular, after the media beds 112 are pressurized, the valve assembly 108 is operated to establish fluid communication between the media beds 112 and the outlet port 106, in order to supply the product gas to the outlet port 106 for use.

The pressure at which the air is supplied to the media beds 112 is selected based on the material properties of the adsorbent material in the media beds 112. In particular, adsorption is dependent on pressure, and the volume of a gas that is adsorbed by the adsorbent material increases as the pressure rises. In addition, nitrogen is adsorbed by the adsorbent material that is used in the media beds 112 (e.g., zeolite) more readily than oxygen is at the same pressure. Thus, pressurization of the media beds 112 causes adsorption of a portion of the nitrogen in the air supplied to the media beds 112, and oxygen can be released from the media beds 112 while the nitrogen is retained in the media beds 112 by the adsorbent material. The oxygen supplied from the media beds 112 may be stored in the product gas storage tank 116 and/or supplied for use as the product gas through the outlet port 106. As needed, the media beds 112 can be purged by lowering the pressure in the media beds 112 so that the nitrogen is released from the adsorbent material, and this gas is vented from the oxygen concentrator 100, for example, through a vent port 122.

Operation of the oxygen concentrator 100 is regulated by the controller 118 and the user interface 120. The controller 118 is configured to regulate operation of the oxygen concentrator 100 and control operation of various components of the oxygen concentrator 100 (e.g., the compressor 110, the valve assembly 108, and/or other components) by electrical connections of controller 118 to the components in order to cause operation of the components according to outputs from the controller 118. The controller 118 may include a general-purpose computing device, such as a computing device that includes one or more processors, a short term memory device, and a long term storage device. In some embodiments, the controller 118 may include a special purpose computing device, such as an integrated circuit or an application specific integrated circuit. The controller 118 may be provided with control software that is executed by the controller 118 to cause the controller 118 to cause operation of the various components of the oxygen concentrator 100 in the desired manner. The user interface 120 is in electrical communication with the controller 118, and may include components such as buttons, knobs, and other types of input components that allow a user to change the operating state of the oxygen concentrator 100, such as by starting and stopping production of the product gas. The user interface 120 may include output components that show information regarding the state of the oxygen concentrator 100.

Figure 2:
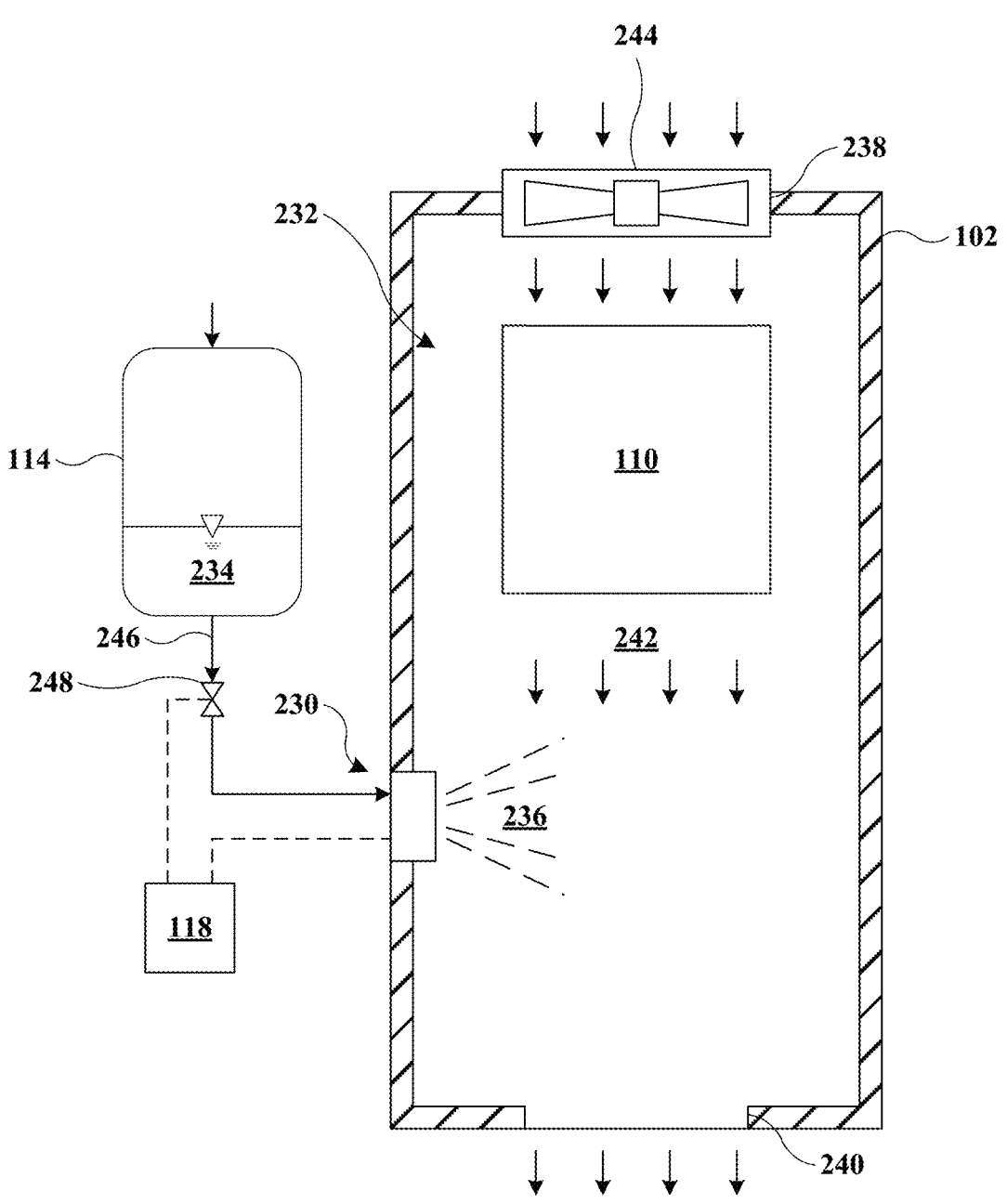
FIG. 2 is a schematic illustration of a water removal device according to an example.

FIG. 2 is a schematic illustration showing a water removal device 230 that may be included in the oxygen concentrator 100. The housing 102 defines a cooling duct 232, and the water removal device 230 is located in or exposed to the cooling duct 232. As will be described herein, the water removal device 230 is configured to receive liquid waste water 234 and aerosolize the liquid waste water 234, resulting in aerosolized waste water 236, which is introduced into the cooling duct 232 to expose the aerosolized waste water 236 to waste heat from the compressor 110, in order to promote evaporation of the aerosolized waste water 236. The aerosolized waste water 236 comprises microscopic droplets of the liquid waste water 234 that are carried in the air. As an example, the droplet size of the droplet in the aerosolized waste water 236 is less than 50 µm, and in some implementations, the droplet size of the droplet in the aerosolized waste water 236 may be less than 10 µm.

The cooling duct 232 extends through the housing 102, for example from an inlet 238 to an outlet 240. The inlet 238 is in communication with an ambient environment (e.g., an environment external to the oxygen concentrator 100), and receives a stream of air 242 from the ambient environment. The outlet 240 is in communication with the ambient environment and exhausts the stream of air 242 to the ambient environment. A fan 244 is connected to the housing 102 and is in communication with the cooling duct 232. As examples, the fan 244 may be located in the cooling duct 232, located at the inlet 238 of the cooling duct 232, or located at the outlet 240 of the cooling duct 232. The fan 244 is configured circulate the stream of air 242 through the cooling duct 232 so that the stream of air 242 absorbs at least some of the waste heat from the compressor 110. Thus, the stream of air 242 is heated as it passes through the cooling duct 232, before being exhausted to the ambient environment at the outlet 240.

The cooling duct 232 is exposed to waste heat from the compressor 110. In some implementations, the compressor 110 is located in the housing 102 and is outside of the cooling duct 232 so that the waste heat may be transferred indirectly from the compressor 110 to the stream of air 242 in the cooling duct 232. In such implementations, the compressor 110 may be adjacent to the cooling duct 232. In some implementations, at least part of the compressor 110 is located in the cooling duct 232 so that the waste heat may be transferred directly from the compressor 110 to the stream of air 242 in the cooling duct 232.

The water removal device 230 is located in or exposed to the cooling duct 232, and is configured to aerosolize the liquid waste water 234, thereby generating the aerosolized waste water 236. As an example, the water removal device 230 may include a piezo actuator that is configured to aerosolize the liquid waste water 234 to generate the aerosolized waste water 236.

The aerosolized waste water 236 is introduced into the cooling duct 232 by the water removal device, for example, in the form of a mist or spray of the aerosolized waste water 236. This places the aerosolized waste water 236 in contact with the stream of air 242, for example, by mixing the aerosolized waste water 236 with the stream of air 242. Because the stream of air 242 is heated, directly or indirectly, by the waste heat from the compressor 110, placing the aerosolized waste water 236 in the cooling duct 232 exposes the aerosolized waste water 236 to the waste heat from the compressor 110 in the cooling duct 232. Exposing the aerosolized waste water 236 to the waste heat from the compressor 110 promotes evaporation of the aerosolized waste water 236 using the waste heat from the compressor 110, as the evaporation rate of water is dependent on temperature.

The liquid waste water 234 may be supplied to the water removal device 230 from a tank, such as the air storage tank 114 in the illustrated example. Compressed air is supplied to the air storage tank 114, and water vapor in the compressed air condenses and collects in the air storage tank 114, thereby defining the liquid waste water 234. As an example, the liquid waste water 234 may collect at a bottom portion of the air storage tank 114, in communication with a water outlet 246 at the bottom of the air storage tank 114. The water outlet 246 is connected to a waste water valve 248, which may be part of the valve assembly 108. When the waste water valve 248 is moved from a closed position to an open position, the pressure of the compressed air in the air storage tank 114 exerts pressure on the liquid waste water 234, causing the liquid waste water 234 to flow to the water removal device 230. The waste water valve 248 may be an electromechanical valve that is configured to move between the closed position and the open position in response to control signals transmitted from the controller 118. Thus, the controller 118 may regulate supply of the liquid waste water 234 to the water removal device 230 using the waste water valve 248.

Figure 3A:
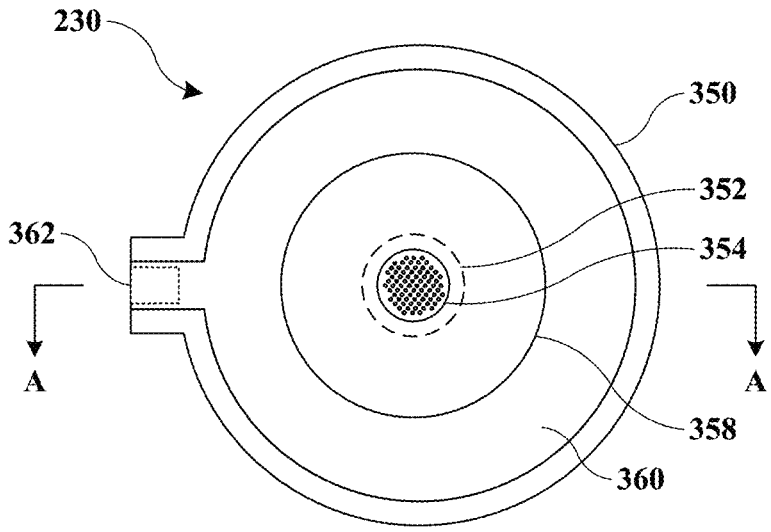
FIG. 3A is a front view of the water removal device of FIG. 2.
Figure 3B:
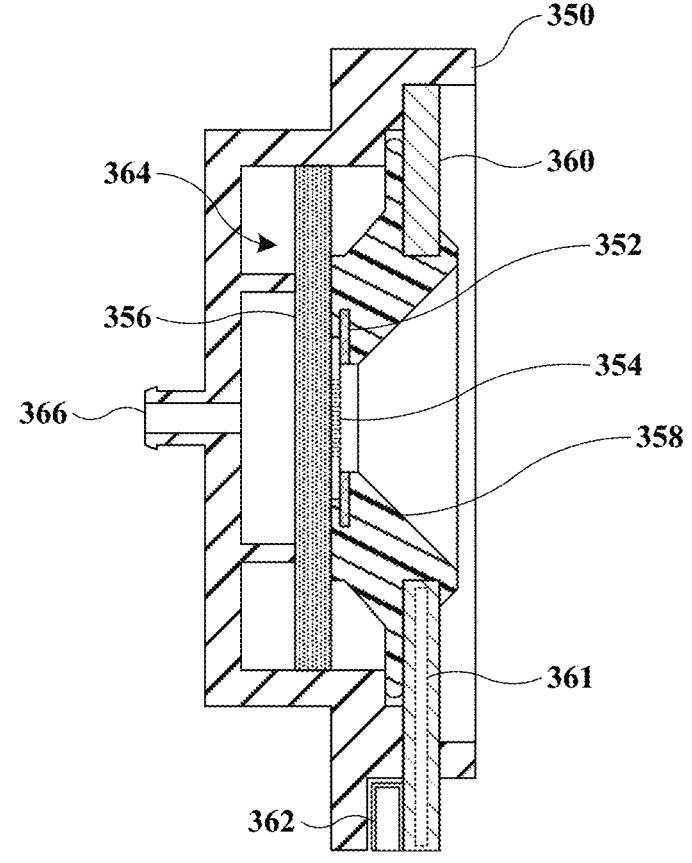
FIG. 3B is a cross-section view of the water removal device of FIG. 2, taken along line A-A of FIG. 3A.

FIG. 3A is a front view of an example implementation of the water removal device 230, and FIG. 3B is a cross-section view of the water removal device 230, taken along line A-A of FIG. 3A. The water removal device includes a device housing 350, a piezo actuator 352, a perforated plate 354, a water absorbing pad 356, a seal 358, a circuit board 360 that includes a driver circuit 361, and an electrical connector 362 that is electrically connected to the driver circuit 361 for connecting the driver circuit 361 to the controller 118.

The device housing 350 is a structure that is configured to hold the components of the water removal device 230. As an example, the device housing may include interconnected walls that are configured to define an interior space of the device housing 350 and/or to support the components of the water removal device 230. The device housing 350 may be formed from plastic or from another suitable material. In combination with the other components of the water removal device 230, the device housing 350 defines a reservoir 364 within the device housing 350.

The piezo actuator 352 is an electrically operated device that is configured to convert electrical energy into a mechanical displacement according to the piezoelectric effect, by which certain materials produce an electric charge in response to deformation and conversely deform in response to application of an electric charge. As an example, the piezo actuator 352 may include a piezoceramic material. As an example, the piezo actuator 352 may deform to define an actuator stroke of less than 100 μm upon application of electric charge. In the water removal device 230, the driver circuit 361 is configured to generate a high-frequency signal (e.g., at a frequency above 100 kHz, such as approximately 112 kHz) and supply the high-frequency signal to the piezo actuator 352. The high-frequency signal, when applied to the piezo actuator 352, causes vibration of the piezo actuator 352 according to the high-frequency signal.

The piezo actuator 352 is configured to aerosolize the liquid waste water 234. To do so, the piezo actuator 352 is coupled (e.g., bonded) to the perforated plate 354. In combination, the piezo actuator 352 and the perforated plate 354 may be referred to as a piezo atomizer. The perforated plate is a thin structure, such as a metal sheet or a metal screen, having a large number of very small diameter holes formed through it (e.g., approximately six hundred holes within a 6.35 mm circle). As examples, the holes may each have a diameter of approximately 4-10 μm, resulting in a droplet size of approximately 4-10 μm during operation of the piezo actuator. In the illustrated implementation, the piezo actuator 352 is configured as a ring, and the holes of the perforated plate 354 are located within the central aperture of the ring defined by the piezo actuator 352, thereby allowing water to pass through the holes of the perforated plate 354. Other configurations may be used.

The perforated plate 354 is exposed to the liquid waste water 234 and is vibrated by the piezo actuator 352 to aerosolize the liquid waste water 234. In particular, operation of the piezo actuator causes deformation of the perforated plate 354 according to the vibration of the piezo actuator 352. This deformation causes the holes of the perforated plate 354 to vibrate rapidly relative to the liquid waste water 234, causing cavitation of the liquid waste water 234 so that the liquid waste water 234 is forced through the holes of the perforated plate 354, defining microscopic droplets that exit as an aerosol stream, thereby defining the aerosolized liquid waste water 234. In particular, as the perforated plate 354 is deformed, one of the holes may move away from the liquid waste water 234, thereby drawing the liquid waste water 234 into the hole by capillary action, and subsequent movement of the hole back toward the liquid waste water 234 forces a microscopic droplet through the hole.

To expose the liquid waste water 234 to the perforated plate 354, the liquid waste water 234 is introduced into the reservoir 364 of the device housing 350 through a port 366. The water absorbing pad 356 is located in the reservoir 364 and is located adjacent to the perforated plate 354 to supply the liquid waste water 234 to the perforated plate 354. The water absorbing pad 356 may be formed from a material, such as a textile, having good capillary action, so that contact with the liquid waste water 234 causes the water absorbing pad 356 to become saturated with the liquid waste water, thereby ensuring that some of the liquid waste water 234 is located adjacent to the perforated plate 354 so that it may be aerosolized during operation of the piezo actuator 352. Features of the device housing 350 or other structures provided in the reservoir 364 may engage the water absorbing pad 356 in order to maintain contact of the water absorbing pad 356 with the perforated plate 354.

The seal 358 is an annular member that is formed from a resilient material, such as silicone, and is configured to define a sealed interface between the device housing 350 and the combined structure of the piezo actuator 352 and the perforated plate 354. In the illustrated implementation, the seal 358 is an annular body having an outer periphery engaged with the device housing 350 and having an inner periphery engaged with the combined structure of the piezo actuator 352 and the perforated plate 354 (e.g., the inner periphery may be engaged with at least one of the piezo actuator 352 and the perforated plate 354. The seal 358 cooperates with the device housing 350 and the combined structure of the piezo actuator 352 and the perforated plate 354 to define the reservoir 364.

The circuit board 360 is connected to the device housing 350 and includes the driver circuit 361. This allows the driver circuit 361 to be packaged as part of the water removal device 230. It should be understood that the driver circuit 361 could be packaged separately. The circuit board 360 may also serve as part of the structure of the water removal device 230, such as by compressing the seal 358 between the circuit board 360 and the device housing 350.

Figure 4:
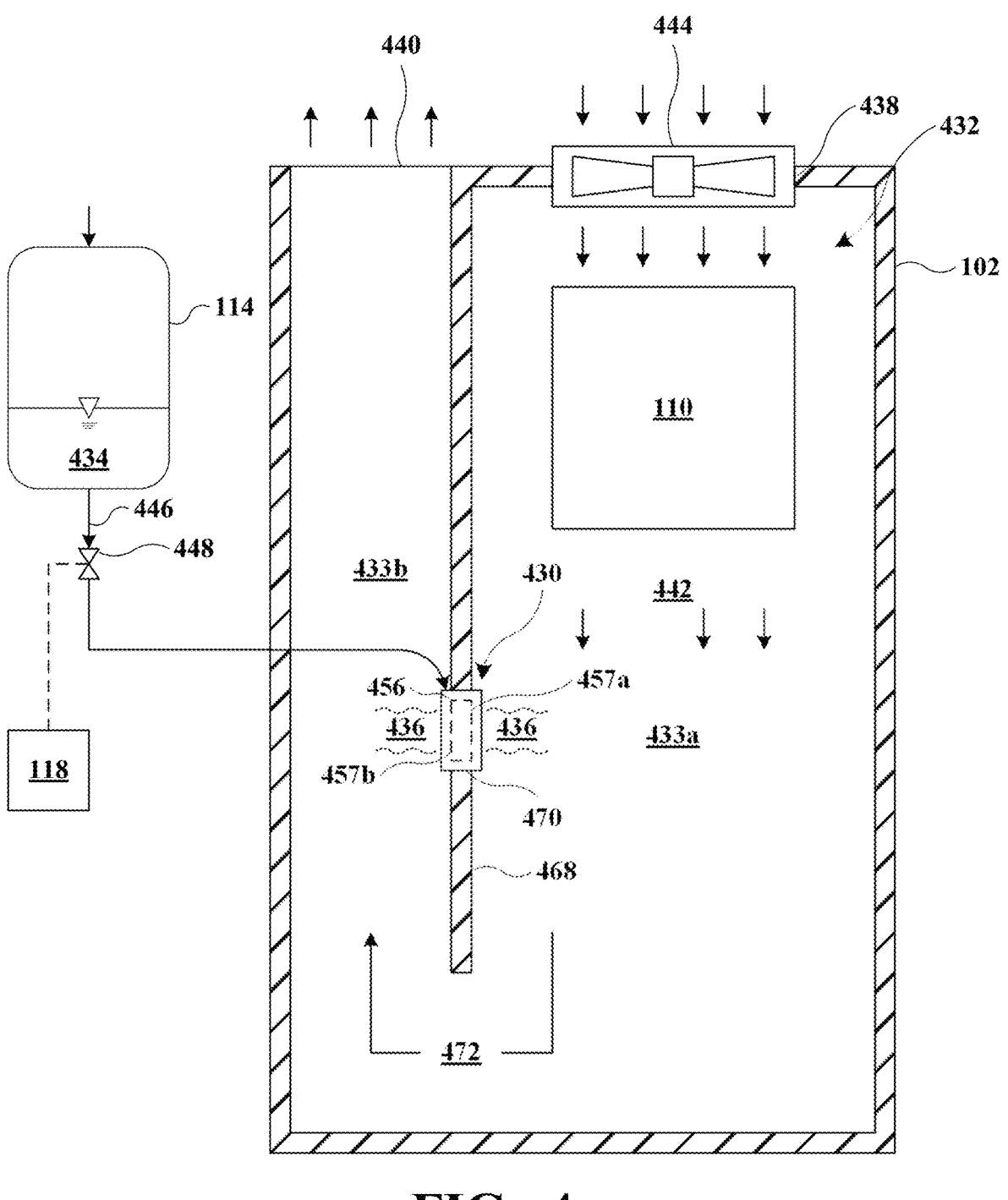
FIG. 4 is a schematic illustration of a water removal device according to an example.

FIG. 4 is a schematic illustration showing a water removal device 430 that may be included in the oxygen concentrator 100. The housing 102 defines a cooling duct 432, and the water removal device 430 is located in or exposed to the cooling duct 432. As will be described herein, the water removal device 430 is configured to receive liquid waste water 434 and facilitate evaporation of the liquid waste water 434 in the cooling duct 432 using waste heat from the compressor 110, thereby changing the liquid waste water into water vapor 436. As in the previous example, the compressor 110 is located in the housing 102, is configured to compress air, generates liquid waste water as a byproduct, and generates waste heat during operation of the compressor 110.

The housing 102 defines the cooling duct 432, which extends through the housing 102, for example from an inlet 438 to an outlet 440. The inlet 438 is in communication with an ambient environment (e.g., an environment external to the oxygen concentrator 100), and receives a stream of air 442 from the ambient environment. The outlet 440 is in communication with the ambient environment and exhausts the stream of air 442 to the ambient environment. A fan 444 is connected to the housing 102 and is in communication with the cooling duct 432. As examples, the fan 444 may be located in the cooling duct 432, located at the inlet 438 of the cooling duct 432, or located at the outlet 440 of the cooling duct 432. The fan 444 is configured circulate the stream of air 442 through the cooling duct 432 so that the stream of air 442 absorbs at least some of the waste heat from the compressor 110. Thus, the stream of air 442 is heated as it passes through the cooling duct 432, before being exhausted to the ambient environment at the outlet 440.

The cooling duct 432 is exposed to waste heat from the compressor 110. In some implementations, the compressor 110 is located in the housing 102 and is outside of the cooling duct 432 so that the waste heat may be transferred indirectly from the compressor 110 to the stream of air 442 in the cooling duct 432. In such implementations, the compressor 110 may be adjacent to the cooling duct 432. In some implementations, at least part of the compressor 110 is located in the cooling duct 432 so that the waste heat may be transferred directly from the compressor 110 to the stream of air 442 in the cooling duct 432.

The cooling duct 432 includes a first portion 433a and a second portion 433b that are both adjacent to a housing wall 468 of the housing 102. An opening 470 is formed in the housing wall 468, and the water removal device 430 is located in the opening 470 of the housing wall 468 so that the water removal device 430 blocks the opening 470. This configuration exposes the water removal device 430 to both of the first portion 433a and the second portion 433b of the cooling duct 432.

As the stream of passes through the cooling duct 432, the stream of air first passes through the first portion of the cooling duct 432 and later passes through the second portion 433b of the cooling duct 432. This causes the stream of air to pass the water removal device 430 twice, by passing by a first side of the water removal device 430 in the first portion 433a of the cooling duct 432 and by later passing by a second side of the water removal device 430 in the second portion 433b of the cooling duct 432. In the illustrated implementation, the cooling duct 432 has a generally u-shaped configuration, with the first portion 433a and the second portion 433b being separated by the housing wall 468 and meeting one another at a one hundred and eighty degree turn 472.

The water removal device 430 is located in the cooling duct 432 and is exposed to both of the first portion 433a and the second portion 433b of the cooling duct 432. To allow evaporation of the liquid waste water 434 from the water removal device 430 to the cooling duct 432, the water removal device 430 includes an evaporation pad 456 that is exposed to the first portion 433a of the cooling duct 432 and to the second portion 433b of the cooling duct 432. More particularly, the evaporation pad may be a generally planar structure having a thickness dimension between a first surface 457a and a second surface 457b that is small compared to a length dimension and a width dimension of the evaporation pad 456 (or as compared to a diameter in the case of a circular configuration of the evaporation pad 456. Thus, the evaporation pad 456 may include the first side, such as the first surface 457a, that faces the first portion 433a of the cooling duct 432, and a second side, such as the second surface 457b, that faces the second portion 433b of the cooling duct 432.

The liquid waste water 434 is supplied to the evaporation pad 456 to expose the liquid waste water 434 to the stream of air in the cooling duct 432 to promote evaporation of the liquid waste water 434 using the waste heat from the compressor 110, resulting in the water vapor 436, which mixes with the stream of air 442 so that it may exit the housing 102 at the outlet 440. The liquid waste water 434 may be supplied to the water removal device 430 from a tank, such as the air storage tank 114 in the illustrated example. As an example, the liquid waste water 434 may be supplied to the water removal device 430 under pressure from the air storage tank 114 via a water outlet 446 and a waste water valve 448 that are equivalent in configuration and function to the water outlet 246 and the waste water valve 248.

Figure 5A:
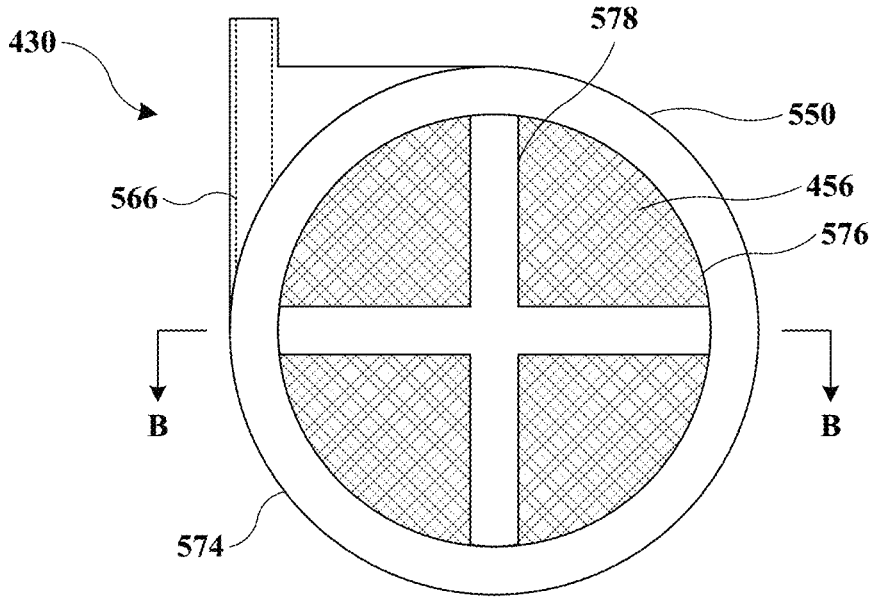
FIG. 5A is a front view of the water removal device of FIG. 4.
Figure 5B:
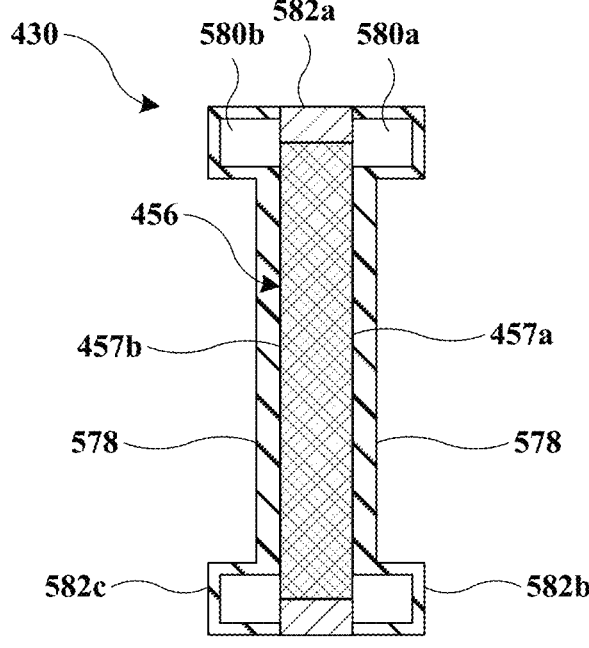
FIG. 5B is a cross-section view of the water removal device of FIG. 4, taken along line B-B of FIG. 5A.

FIG. 5A is a front view of an example implementation of the water removal device 430, and FIG. 5B is a cross-section view of the water removal device 430, taken along line B-B of FIG. 5A. The water removal device 430 includes a device housing 550 and the evaporation pad 456. The device housing 450 is a structure, formed from multiple parts in the illustrated implementation, which is configured to support and retain the evaporation pad 456 and to distribute the liquid waste water 434 to the evaporation pad 456. The device housing 550 includes a port 566 by which the liquid waste water 434 enters the device housing 450. In the illustrated implementation, the device housing 550 includes an outer portion 574, that is configured to hold an outer periphery of the evaporation pad 456 and conduct the liquid waste water 434 such that it is able to contact the evaporation pad 456 at various locations on the periphery of the evaporation pad 456, such as continuously around the periphery of the evaporation pad 456. The outer portion 574 is configured as a ring in the illustrated implementation. Openings 576 are defined by device housing 550 inward of the outer portion 574 to expose the first surface 457a and the second surface 457b of the evaporation pad 456 to the cooling duct 432, and retainers 578 cross the openings 576 to retain the evaporation pad 456.

To distribute the liquid waste water 434 to the evaporation pad 456, the device housing includes one or more channels, such as a first side channel 580a and a second side channel 580b that are located at the periphery of the evaporation pad 456 adjacent to the first surface 457a and the second surface 457b thereof, respectively. As an example, the first side channel 580a and the second side channel 580b may extend around the periphery of the evaporation pad 456, such as continuously around the periphery of the evaporation pad

456 in a circular configuration as in the illustrated implementation. Thus, the water removal device 430 defines a channel, such as the first side channel 580*a* and/or the second side channel 580*b*, that extends around the evaporation pad 456 and is configured to carry the liquid waste water 434 in order to distribute the liquid waste water 434 to the evaporation pad 456. This configuration allows for even distribution of the liquid waste water 434 to the evaporation pad 456.

The device housing 550 may be a multi-part structure. In the illustrated implementation, the device housing 550 includes a central portion 582*a*, a first side portion 582*b*, and a second side portion 582*c*. The central portion includes the port 566 and provides a base structure in which the evaporation pad 456 and to which the first side portion 582*b* and the second side portion 582*c* may be attached. The first side portion 582*b* defines the first side channel 580*a*. The second side portion 582*c* defines the second side channel 580*b*. The retainers 578 are defined by both of the first side portion 582*b* and the second side portion 582*c* so that they are located on both sides of the evaporation pad 456.

What is claimed is:

1. A gas supply system, comprising:
a housing that defines a cooling duct;
a compressor that is located in the housing, is configured to compress air, generates liquid waste water as a byproduct, and generates waste heat during operation of the compressor; and
a water removal device that aerosolizes the liquid waste water to generate aerosolized waste water and exposes the aerosolized waste water to the waste heat from the compressor in the cooling duct to promote evaporation of the aerosolized waste water using the waste heat from the compressor.

2. The gas supply system of claim 1, wherein the water removal device includes a piezo actuator that is configured to aerosolize the liquid waste water.

3. The gas supply system of claim 2, wherein the piezo actuator is configured to convert electrical energy into a mechanical displacement according to piezoelectric effect.

4. The gas supply system of claim 2, wherein the water removal device includes a perforated plate that is exposed to the liquid waste water and vibrated by the piezo actuator to aerosolize the liquid waste water.

5. The gas supply system of claim 4, wherein the perforated plate includes holes that each have a diameter of between 4 μm and 10 μm.

6. The gas supply system of claim 4, wherein vibration of the perforated plate by the piezo actuator defines droplets of the liquid waste water, the droplets having a droplet size between 4 μm and 10 μm.

7. The gas supply system of claim 4, wherein the water removal device includes a driver circuit that is configured to generate a high-frequency signal and to supply the high-frequency signal to the piezo actuator.

8. The gas supply system of claim 4, wherein the water removal device includes a water absorbing pad that is located adjacent to the perforated plate to supply the liquid waste water to the perforated plate.

9. The gas supply system of claim 8, wherein the water removal device includes a device housing that defines a reservoir, and the water absorbing pad is located in the reservoir.

10. The gas supply system of claim 9, further comprising:
a seal, wherein the seal is annular, having an outer periphery engaged with the device housing and having an inner periphery engaged with at least one of the piezo actuator or the perforated plate to further define the reservoir.

11. The gas supply system of claim 9, wherein the device housing defines a port, and the liquid waste water is introduced into the reservoir of the device housing through the port.

12. The gas supply system of claim 1, further comprising:
a fan that circulates a stream of air through the cooling duct so that the stream of air absorbs at least some of the waste heat from the compressor.

13. The gas supply system of claim 12, wherein the cooling duct has an inlet that receives the stream of air from an ambient environment and an outlet that exhausts the stream of air to the ambient environment.

14. The gas supply system of claim 1, further comprising:
adsorbent media beds that receive compressed air from the compressor and are controlled according to at least one of a pressure swing adsorption cycle or a vacuum pressure swing adsorption cycle to generate an oxygen enriched gas.

15. A gas supply system, comprising:
a housing that defines a cooling duct, the cooling duct including a first portion and a second portion that are both adjacent to a housing wall, wherein an opening is formed in the housing wall;
a compressor that is located in the housing, is configured to compress air, generates liquid waste water as a byproduct, and generates waste heat during operation of the compressor; and
a water removal device that is located in the opening of the housing wall so that the water removal device blocks the opening, the water removal device including an evaporation pad that is exposed to the first portion of the cooling duct and the second portion of the cooling duct, wherein the liquid waste water is supplied to the evaporation pad to expose the liquid waste water to a stream of air in the cooling duct to promote evaporation of the liquid waste water using the waste heat from the compressor.

16. The gas supply system of claim 15, wherein a first side of the evaporation pad faces the first portion of the cooling duct, and second side of the evaporation pad faces the second portion of the cooling duct.

17. The gas supply system of claim 15, wherein the water removal device defines a channel that extends around the evaporation pad and is configured to carry the liquid waste water in order to distribute the liquid waste water to the evaporation pad.

18. The gas supply system of claim 15, further comprising:
a fan that circulates the stream of air through the cooling duct so that the stream of air absorbs at least some of the waste heat from the compressor.

19. The gas supply system of claim 15, wherein the cooling duct has an inlet that receives the stream of air from an ambient environment and an outlet that exhausts the stream of air to the ambient environment.

20. The gas supply system of claim 15, further comprising:
adsorbent media beds that receive compressed air from the compressor and are controlled according to at least one of a pressure swing adsorption cycle or a vacuum pressure swing adsorption cycle to generate an oxygen enriched gas.

* * * * *